(12) United States Patent
Horth

(10) Patent No.: US 9,946,020 B1
(45) Date of Patent: Apr. 17, 2018

(54) MODE MATCHED Y-JUNCTION

(71) Applicant: Elenion Technologies, LLC, New York, NY (US)

(72) Inventor: Alexandre Horth, Astoria, NY (US)

(73) Assignee: Elenion Technologies, LLC, New York, NY (US)

( * ) Notice: Subject to any disclaimer, the term of this patent is extended or adjusted under 35 U.S.C. 154(b) by 0 days.

(21) Appl. No.: 15/423,843

(22) Filed: Feb. 3, 2017

(51) Int. Cl.
| | | |
|---|---|---|
| *G02B 6/12* | (2006.01) | |
| *G02B 6/125* | (2006.01) | |
| *G02B 6/126* | (2006.01) | |
| *G02B 6/14* | (2006.01) | |
| *G02B 6/124* | (2006.01) | |
| *G02B 6/122* | (2006.01) | |

(52) U.S. Cl.
CPC ............ *G02B 6/125* (2013.01); *G02B 6/124* (2013.01); *G02B 6/126* (2013.01); *G02B 6/1228* (2013.01); *G02B 6/14* (2013.01)

(58) Field of Classification Search
None
See application file for complete search history.

(56) References Cited

U.S. PATENT DOCUMENTS

| | | | | |
|---|---|---|---|---|
| 5,586,209 A | * | 12/1996 | Matsuura | G02B 6/12007 385/132 |
| 9,217,829 B2 | * | 12/2015 | Zhang | G02B 6/2808 |
| 2003/0113066 A1 | * | 6/2003 | Kim | G02B 6/125 385/48 |
| 2006/0039646 A1 | * | 2/2006 | Nashimoto | G02F 1/3137 385/22 |
| 2015/0286004 A1 | * | 10/2015 | Mekis | G02B 6/2808 398/141 |
| 2016/0012176 A1 | | 1/2016 | Liu | |
| 2016/0033765 A1 | | 2/2016 | Liu | |

* cited by examiner

*Primary Examiner* — Sung Pak
(74) *Attorney, Agent, or Firm* — Nixon Peabody LLP

(57) ABSTRACT

A mode-matched waveguide Y-junction with balanced or unbalanced splitting comprises an input waveguide, expanding from an input end to an output end, for expanding the input beam of light along a longitudinal axis; first and second output waveguides extending from the output end of the input waveguide separated by a gap. Ideally, each of the first and second output waveguides includes an initial section capable of supporting a fundamental super mode, and having an inner wall substantially parallel to the longitudinal axis, and a mode splitting section extending from the initial section at an acute angle to the longitudinal axis.

20 Claims, 7 Drawing Sheets

US 9,946,020 B1

MODE MATCHED Y-JUNCTION

TECHNICAL FIELD

The present invention relates to a waveguide Y-junction, and in particular to a mode-matched waveguide Y-junction with balanced or unbalanced splitting.

BACKGROUND

With reference to FIGS. 1a, 1b and 1c, a junction section (JS) 4 of a conventional semiconductor waveguide Y-junction splitter 1 receives an input beam at an input port 2 for transmission to an input waveguide 3, and splits the input beam into two output beams onto two output waveguides 6 and 7 for output to two output ports 8 and 9, respectively. Typically, the input port 2 and the output ports 8 and 9 are optically coupled to external waveguides (not shown) for transmitting the optical beams to and from the Y-junction splitter 1. A good Y-junction splitter is characterized by low insertion loss (IL), i.e. the amount of power lost through the Y-junction splitter that does not go to the output waveguides 8 and 9; low return loss (RL), the amount of light reflected by the JS 4; and good split ratio, e.g. a balanced Y-junction splits evenly 50:50, not 51:49.

One problem that arises, especially with a high-index contrast platform, such as Si/SiO2 or SiN/SiO2, is that there can be an abrupt change in mode profile between the optical mode guided just before the JS 4 and the optical mode just after the JS 4. The abrupt change results in exciting multiple modes past the JS 4, such as high order guided modes or radiation modes. These parasitic modes can lead to high IL or RL.

Another problem arises with the design of unbalanced Y-junctions splitters. Although balanced Y-junction splitters are intuitively designed by symmetry, designing an unbalanced Y-junction splitter with an arbitrary split ratio is non-trivial; especially when low IL is required.

An object of the present invention is to overcome the shortcomings of the prior art by providing a more efficient Y-junction waveguide splitter.

SUMMARY OF THE INVENTION

Accordingly, the present invention relates to a semiconductor waveguide Y-splitter comprising: an input port for launching an input beam of light; an input waveguide including a longitudinal axis, capable of providing adiabatic expansion of the input beam of light from the input port to an output end, which has a width that supports a fundamental mode and a second order mode; first and second output waveguides extending from the output end of the input waveguide on either side of the longitudinal axis and separated by a gap, wherein each of the first and second output waveguides includes an initial section having an inner wall, defining the gap, substantially parallel to the longitudinal axis, and wherein the initial sections and the gap are capable of supporting a super mode of the incoming beam of light, which spans the first and second output waveguides and the gap; and a mode-matching junction between the input waveguide and the first and second output waveguides for splitting the input beam of light, capable of propagating the fundamental mode of the incoming light to a fundamental super mode.

BRIEF DESCRIPTION OF THE DRAWINGS

The invention will be described in greater detail with reference to the accompanying drawings which represent preferred embodiments thereof, wherein.

DETAILED DESCRIPTION

Figure 1A:
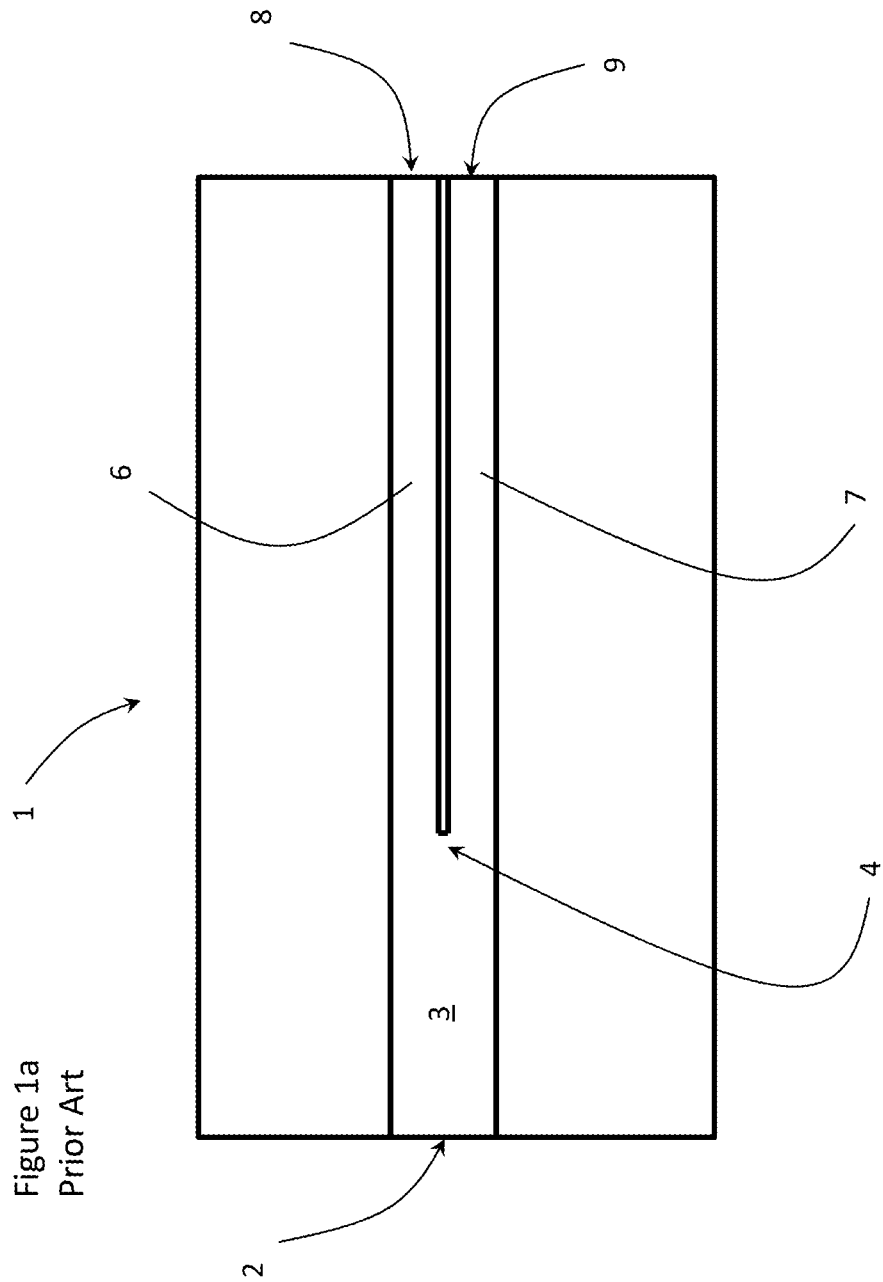
FIG. 1a is a schematic plan view of a junction split section of a conventional Y-junction splitter.

While the present teachings are described in conjunction with various embodiments and examples, it is not intended that the present teachings be limited to such embodiments. On the contrary, the present teachings encompass various alternatives and equivalents, as will be appreciated by those of skill in the art.

With reference to FIGS. 2a, 2b, 2c and 3, a mode-matched semiconductor waveguide Y-junction splitter 11 includes a junction split section 14, which receives an input beam at an input port 12 for transmission to an input waveguide 13, and splits the input beam into two output beams onto two output waveguides 16 and 17 for output to two output ports 18 and 19, respectively. The input port 12 may be along a longitudinal axis 15 of the Y junction splitter 11, which may divide the input waveguide 13 into two symmetrical halves, and provide an axis of symmetry for the two output waveguides 16 and 17.

Ideally, the Y-junction splitter 11 may be comprised of a silicon on insulator (SOI) waveguide, including a high index silicon core sandwiched between upper and lower cladding layers, comprised of lower index silica; however, other forms and semiconductor materials, e.g., high index cores with refractive indexes between 3 and 4, such as SiN or other Group III/V materials, sandwiched between lower index upper and lower cladding layers with refractive indexes between 1 and 2, such as nitride or other Group III/V materials, are within the scope of the invention. Typically, the input port 12 and the output ports 18 and 19 are optically coupled to external waveguides (not shown) for transmitting the optical beams to and from the Y-junction 11.

The input waveguide 13 expands the input beam of light adiabatically from an input end to an output end, whereby the width of the output end of the input waveguide 13 supports two guided modes (see FIG. 2b), e.g., the fundamental mode TE0 (or TM0 depending on polarization) and the second order mode TE1 (or TM1 depending on polarization). There is no need to expand the input waveguide 13 to a width that would support more than two guided modes unless one seeks splitting in more than two output waveguides 16 and 17. The expansion is smooth and long enough, such that light remains in the TE0 mode (a.k.a. adiabatic taper) despite the presence of the second order mode.

Figure 1C:
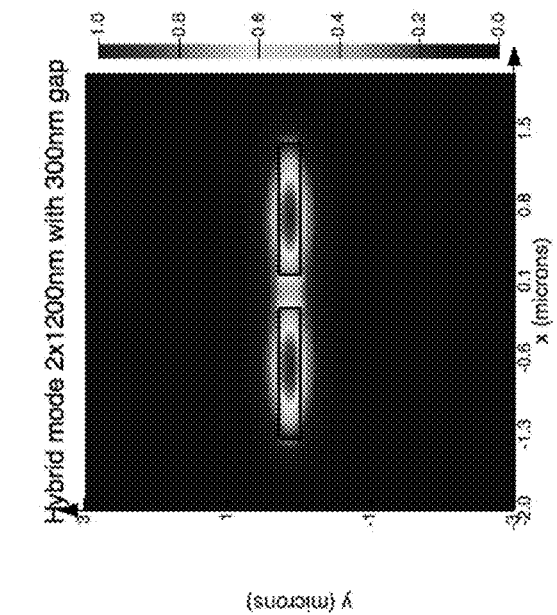
FIG. 1c is a cross-sectional view of the input waveguide of the Y-junction splitter of FIG. 1a at the junction split illustrating light intensity.
Figure 1B:
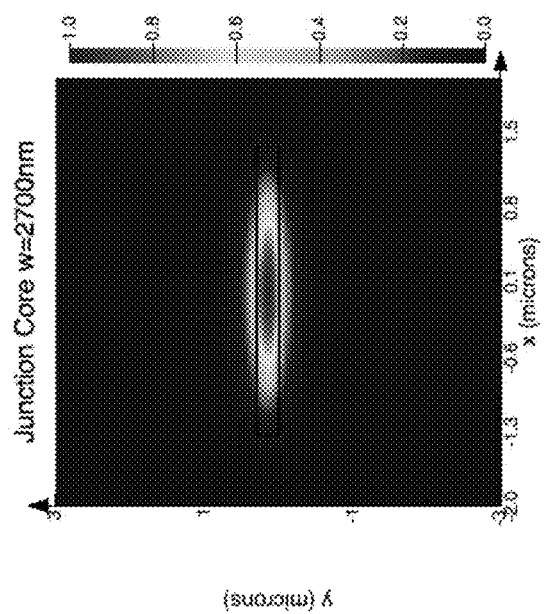
FIG. 1b is a cross-sectional view of the input waveguide of the Y-junction splitter of FIG. 1a illustrating light intensity.
Figure 2A:
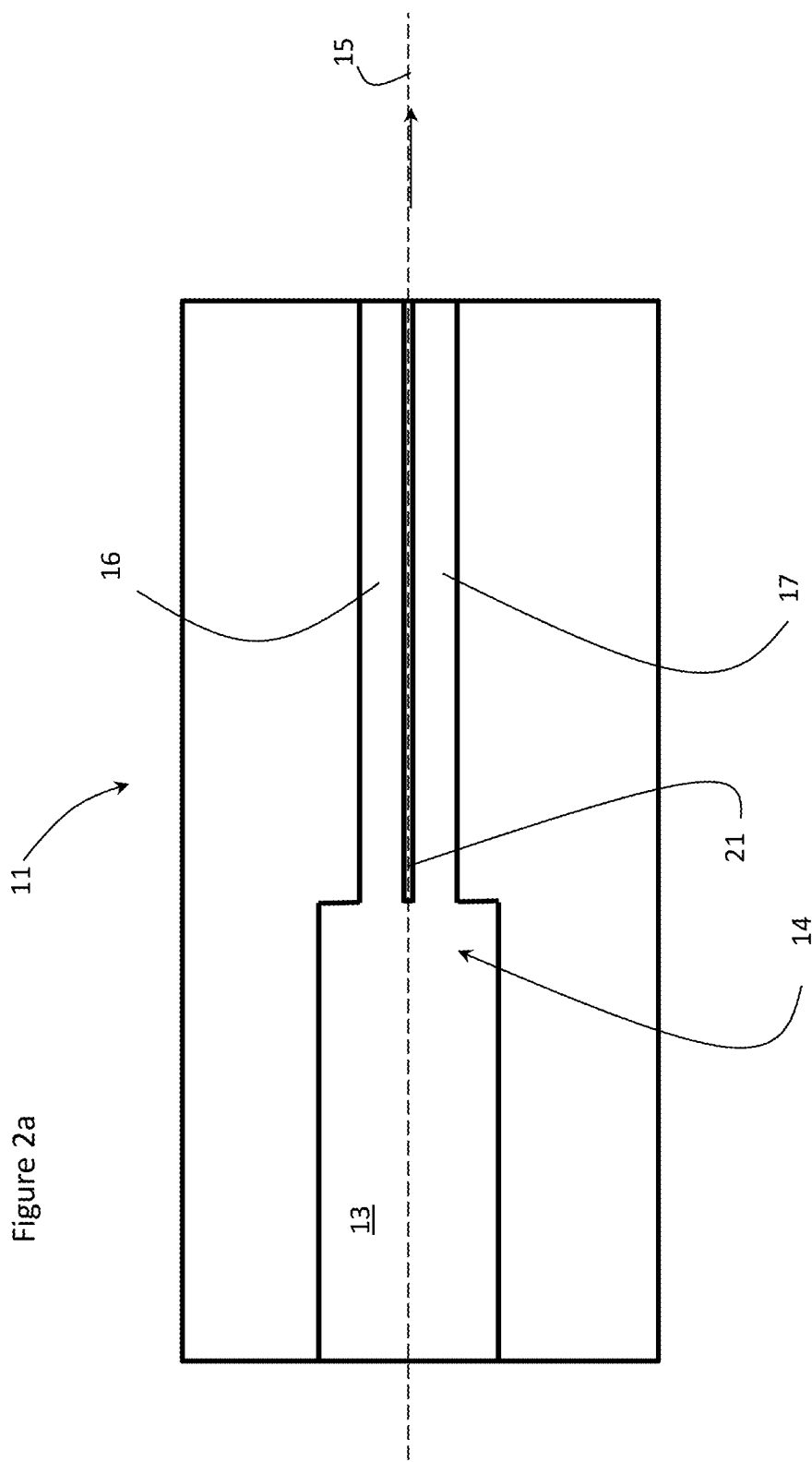
FIG. 2a is a schematic plan view of a junction split section of a Y-junction splitter in accordance with the present invention.
Figure 2C:
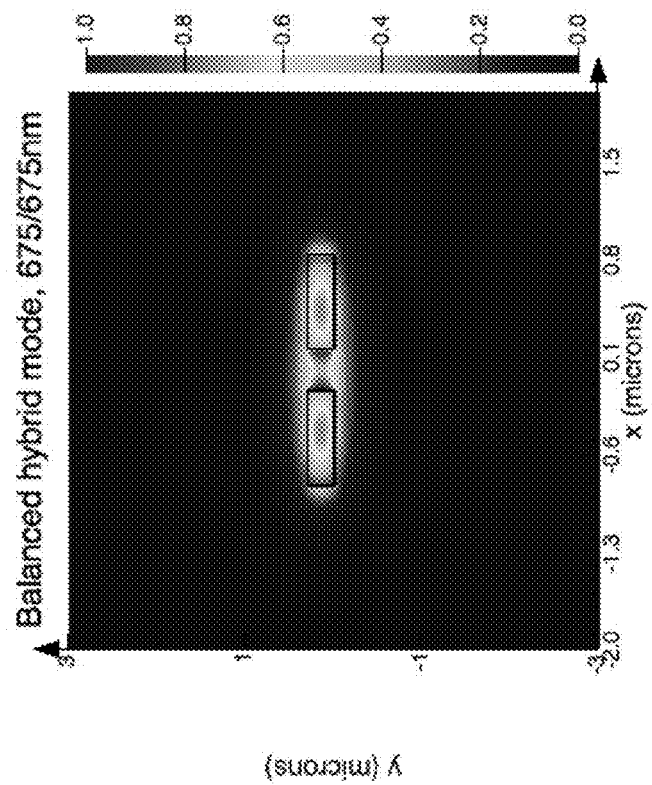
FIG. 2c is a cross-sectional view of the input waveguide of the Y-junction splitter of FIG. 2a at the junction split section illustrating light intensity.
Figure 2B:
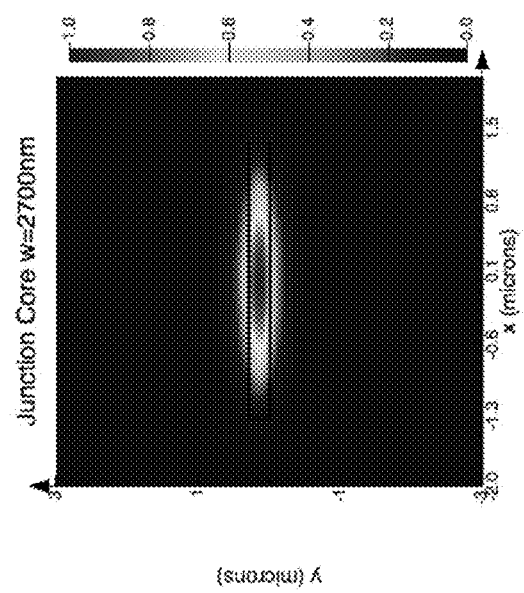
FIG. 2b is a cross-sectional view of the input waveguide of the Y-junction splitter of FIG. 2a illustrating light intensity.

At the JS 14, a super or hybrid mode is supported, which is defined by an arrangement of waveguides that are in close proximity, such that they share the same optical mode. Ideally, the geometry of the super mode, to the right of the JS 14, is optimized to achieve maximal overlap integral with the incoming mode of the input waveguide 13 just left to the JS 14 in order to define a mode-matched junction. (see FIG. 2*c*) A gap 21 between the first and second output waveguides 16 and 17 on the right-hand side of the JS 14 is typically chosen to be as small as the fabrication process allows, e.g. less than 500 nm, ideally between 50 nm and 300 nm. The gap 21 may be larger if coupling from another mode, other than the fundamental mode, is desirable. An important aspect is that the geometry of the super mode should be selected such that it maximizes the overlap integral between the incoming mode (left of JS 14) and the super mode (right of the JS 14). With reference to FIG. 2*c*, the illustrated super mode extends across the gap 21 and into both the first and second output waveguides 16 and 17 on either side thereof, in contrast to FIG. 1*c*, which illustrates two distinct modes in the conventional Y-junction splitter.

Accordingly, at the JS 14 the incoming mode, e.g. TE0, is on the left side and the goal is to engineer the dimensions, e.g. widths of the gap 21 and the initial sections of the output waveguides 16 and 17, such that the incoming TE0 mode excites, as much as possible, the new TE0 super mode supported by the input waveguides 16 and 17. Accordingly, the overall insertion loss of the splitter 11 is kept low by selecting a geometry at the JS 14, such that almost all of the incoming light, e.g., TE0 mode, propagates to the super TE0 mode. This is achieved by first selecting a width of the gap 21 that is as small as possible, e.g., less than 500 nm, ideally between 50 nm and 300 nm, in order to have the super mode fully supported by the initial sections of the input waveguides 16 and 17. Then the widths of at least the initial sections, e.g., up to the entire length, of the output waveguides 16 and 17, are varied while tracking the overlap integral between the incoming TE0 mode at the JS 14 and the super TE0 after the JS 14. Mode matching is achieved when the overlap between these two modes is maximized, resulting in a discontinuity between the input waveguide 13 and the initial sections of the output waveguides 16 and 17 that can look counter-intuitive.

Therefore, past the JS 14 in the initial sections of the output waveguides 16 and 17 most of the light is still confined in the super TE0 mode. When it is in this state it is easy to move the spatial power distribution of the mode by changing the size of the output waveguides 16 and 17. The gap 21 is not increased at least in the initial section in order to maintain the hybridization of the modes, i.e., the initial sections of the output waveguides 16 and 17 are close enough together such that, from the optical stand point, they form a single waveguide.

The mode-matching structure of the JS 14 between the input waveguide 13, and the first and second output waveguides 16 and 17 is provided in order to achieve mode matching between the expanded single mode beam at the output of the input waveguide 13, and the super mode at the input of the first and second output waveguides 16 and 17.

Typically, the outer edge of a Y-junction is a smooth curve; however, in the illustrated example, the width of the input waveguide 13 is wider than the combined widths of the first and second output waveguides 16 and 17 and the gap 21, resulting in a discontinuity in the form of stepped shoulders at the JS 14 on opposite sides thereof adjacent the first and second output waveguides 16 and 17, each shoulder including a surface perpendicular to the direction of light propagation. An added advantage of a junction geometry that accomplishes mode matching is the resilience to fabrication processes that its stable maxima brings (e.g., deviation from the optimal geometry will result in added loss due to mode mismatch, but the added loss will be small around the maxima point.) In an exemplary embodiment, the input waveguide 13 may be 2700 nm wide, while the first and second output waveguides 16 and 17 may be 675 nm wide with a 300 nm gap therebetween, leaving a 525 nm shoulder, e.g., a surface perpendicular to the longitudinal axis 15 adjacent outer sides of the output waveguides 16 and 17, providing the discontinuity. The shoulder may be wider than the gap 21, but not as wide as the output waveguides 16 and 17. The width at the output end of the input waveguide 13 is about twice as wide as the combined width of the first and second output waveguides 16 and 17.

In an alternative embodiment, the mode-matching JS 14 includes a subwavelength gratings in the gap 21 alternative to or in combination with the aforementioned discontinuity. Utilizing a high resolution process, such as electron beam lithography, the subwavelength structures (metamaterial) can be provided to have a very fine grating (~10× smaller than the effective wavelength guided in the input waveguide 13) This effectively increases the effective index of the gap 21, which helps achieve mode matching to the incoming waveguide 13. Such a variation would reduce the height of the shoulder width, which could increase the widths of the output waveguides to approach the full width of the input waveguide 13. The subwavelength gratings could start with a high fill ratio in the gap 21 (more high index material than low in a given period of the grating) and adiabatically taper to a low fill ratio (more low index material than high) at the limit of which a full gap would open between the two output waveguides 16, 17.

Another variation includes splitting the input beam into a plurality, e.g., more than two, output waveguides; whereby the same mode matching technique may be employed at the JS 14.

Figure 3:
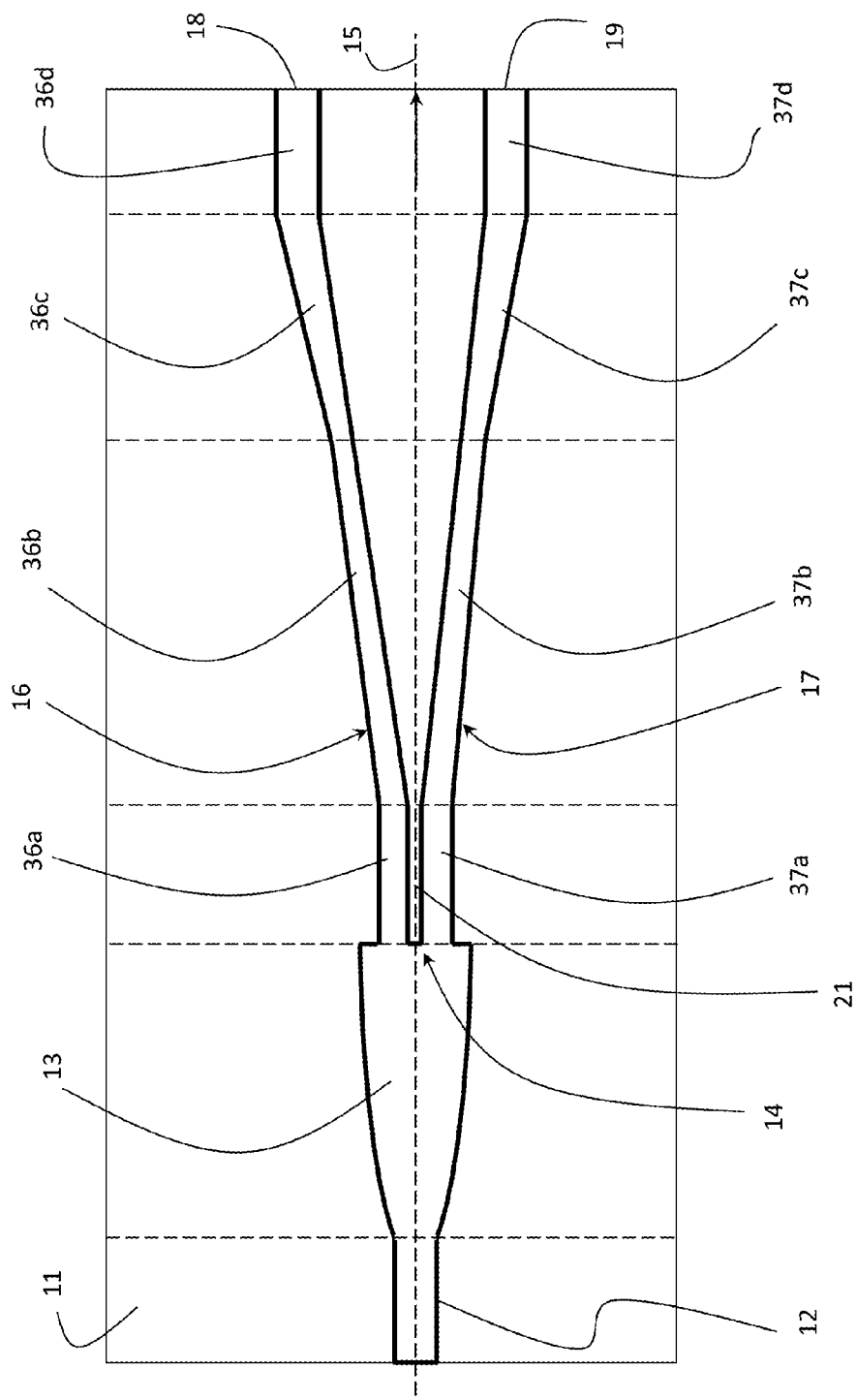
FIG. 3 is a schematic plan view of a Y-junction splitter in accordance with the present invention.

With reference to FIG. 3, the Y-junction splitter 11 of the present invention comprises the input port 12 optically coupled to an input waveguide 13, which gradually expands from an input end proximate the input port 12 to the junction split section 14 at an output end. The input waveguide 13 expands linearly or exponentially with a gradually decreasing slope. However, any other smooth taper shape may be used provided that it is long enough to allow adiabatic mode expansion. The expansion is by at least a factor of 2 or between 1.5 and 2.5, e.g., from a 1.2 µm input end to a 2.7 µm output end. An input beam of light is launched via the input port 12 from an external source, and propagates into the input waveguide 13 to the junction split (JS) section 14 along a longitudinal axis 15 and in the direction of propagation, and expands adiabatically to the output end of the input waveguide 13. The input port 12 may be along the longitudinal axis 15 of the Y junction splitter 11, which may divide the input waveguide 13 into two symmetrical halves, and may provide an axis of symmetry for the entire Y-junction splitter 11.

The width of the input waveguide port 12 is preferably narrow enough to provide propagation of only a single mode of the input beam. The width of the input waveguide 13 expands providing adiabatic expansion in the core region to a width that supports two guided modes, e.g., the fundamental mode TE0 (or TM0 depending on polarization) and the second order mode TE1 (or TM1 depending on polarization). There is no need to expand the input waveguide 13 to a width that would support more than two guided modes unless one seeks splitting in more than two output waveguides 16 and 17. The expansion is smooth and long enough, such that light remains in the TE0 mode (a.k.a. adiabatic taper) despite the presence of the second order mode.

First and second output waveguides 16 and 17, respectively, extend from the output end of the input waveguide 13 with a gap 21 therebetween, symmetrical about the longitudinal axis 15, for receiving first and second portions of the input beam according to a desired splitting ratio, e.g., 50/50, and for outputting the first and second portions to output ports 18 and 19, respectively.

As above, the structure of the mode-matching JS 14 provides that the width of the input waveguide 13 is wider than the combined widths of the first and second output waveguides 16 and 17 and the gap 21, resulting in a mode-matching discontinuity, e.g., a stepped shoulders at the JS 14 on opposite sides thereof adjacent the first and second output waveguides 16 and 17, each shoulder including a surface perpendicular to the direction of light propagation 15. The shoulder may be wider than the gap 21, but may not as wide as the output waveguides 16 and 17. The width at the output end of the input waveguide 13 is about twice as wide as the combined width of the first and second output waveguides 16 and 17.

Each of the first and second output waveguides 16 and 17 are divided into plurality of sections 36a to 36d and 37a to 37d, respectively. Initial sections 36a and 37a may be straight sections parallel to the longitudinal axis 15 with a constant gap width, e.g., between 50 nm to 500 nm, but ideally less than 300 nm, therebetween, and each preferably having a constant width, e.g., 100 nm to 300 nm for $Si/SiO_2$ or 500 nm to 800 nm for $SiN/SiO_2$, enabling the input mode to stably transform into a super mode. The length of the initial sections 36a and 37a are typically less than or equal to one half the length of the input waveguide region 13 or in absolute terms preferably greater than 1 µm, preferably less than 20 µm, and preferably between 5 µm and 10 µm.

Accordingly, at the JS 14 the incoming mode, e.g., TE0, is on the left side and the goal is now to engineer the dimensions, e.g., gap and waveguide widths, of the initial sections of the output waveguides 36a and 37a, such that the incoming TE0 mode excites, as much as possible, the new TE0 super mode supported by the initial sections 36a and 37a. Accordingly, the overall insertion loss of the Y-junction splitter 11 is kept low by selecting a geometry at the JS 14, such that almost all of the incoming light, e.g., TE0 mode, propagates to the super TE0 mode. This is achieved by first selecting a width of the gap 21 that is as small as possible, e.g., 50 nm to 300 nm, in order to have the super mode fully supported by the initial sections 36a and 37a. Then the widths of the initial sections 36a and 37a are varied while tracking the overlap integral between the incoming TE0 mode and the super TE0 mode. Mode matching is achieved when the overlap between these two modes is maximized, resulting in a discontinuity between the input waveguide 13 and the initial sections 36a and 37a of the output waveguides 16 and 17, respectively, that can look counter-intuitive.

Therefore, past the JS 14 in the initial sections 36a and 37a most of the light is still confined in the super TE0 mode. When it is in this state it is easy to move the spatial power distribution of the mode by tapering the size of the initial sections 36a and 37a. The gap 21 is not increased in the initial sections 36a and 37a in order to maintain the hybridization of the modes, i.e., the initial sections 36a and 37a of the output waveguides 16 and 17 are close enough together such that, from the optical stand point, they form a single waveguide.

Once the light is in the super mode, past the JS 14, a V-splitter is used to split the mode into the two mode splitting sections 36b and 37b. The best way of achieving this is using a V-shaped split, in contrast to a typical s-bend. The V-splitter shape constantly separates the two mode splitting sections 36b and 37b at an acute angle, e.g., 3° to 15°, from the longitudinal axis 35, and linearly decouples the output waveguides 36 and 37, which is found to be simpler and more efficient than an otherwise S-bend. Furthermore, the S-bend may result in high order mode coupling, if the bend radius is not large enough; which is avoided using a V-splitter.

Final expansion sections 36c and 37c gradually, e.g., linearly, expand the first and second output waveguides 16 and 17, respectively, by a factor of approximately 1.3 to 2, e.g., from 500 nm to 800 nm to 700 µm to 1.6 µm. Ideally, the inner walls of the final expansion sections 36c and 37c extend coplanar, and are separated by the same angle as the mode splitting sections 36b and 37b; however, any structure is within the scope of the invention. Final expansion sections 36c and 37c are used in the V-splitter, once the gap between the input and output waveguide arms 16 and 17 is sufficiently large, such that it avoids having mode overlap.

Bend sections 36d and 37d redirect the ends of the first and second output waveguides 16 and 17, respectively, to be back parallel with the longitudinal axis 15, and at the same width as the end of the taper sections 36c and 37c. At the output ports 18 and 19 of the Y-junction 11, the output waveguides 16 and 17 are back to the initial width, e.g., for single mode propagation, so that the input and output ports 12, 18 and 19 have the same widths, e.g., the best waveguide width for low loss propagation.

Figure 4:
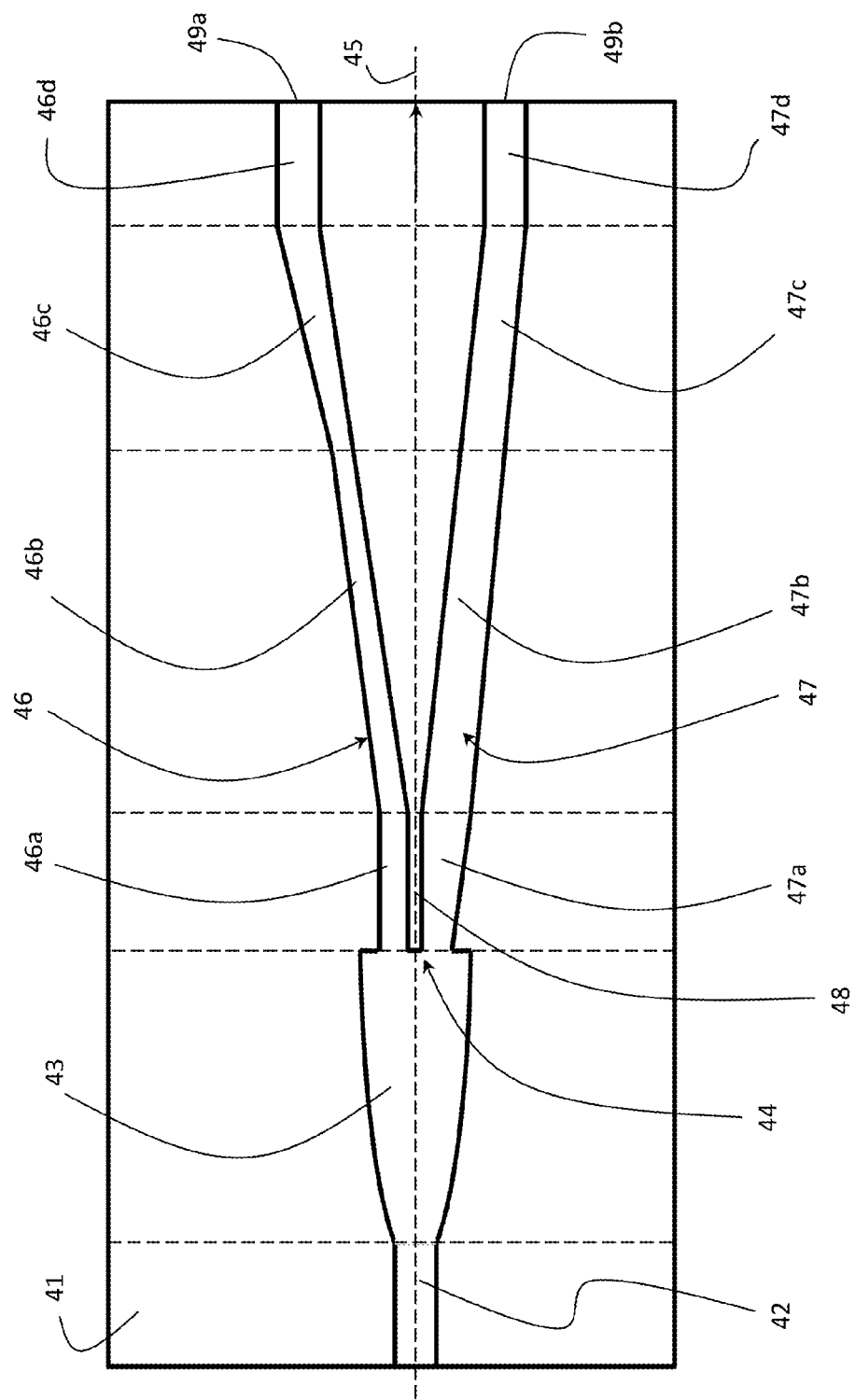
FIG. 4 is a schematic plan view of a Y-junction splitter in accordance with another embodiment of the present invention.
Figure 5:
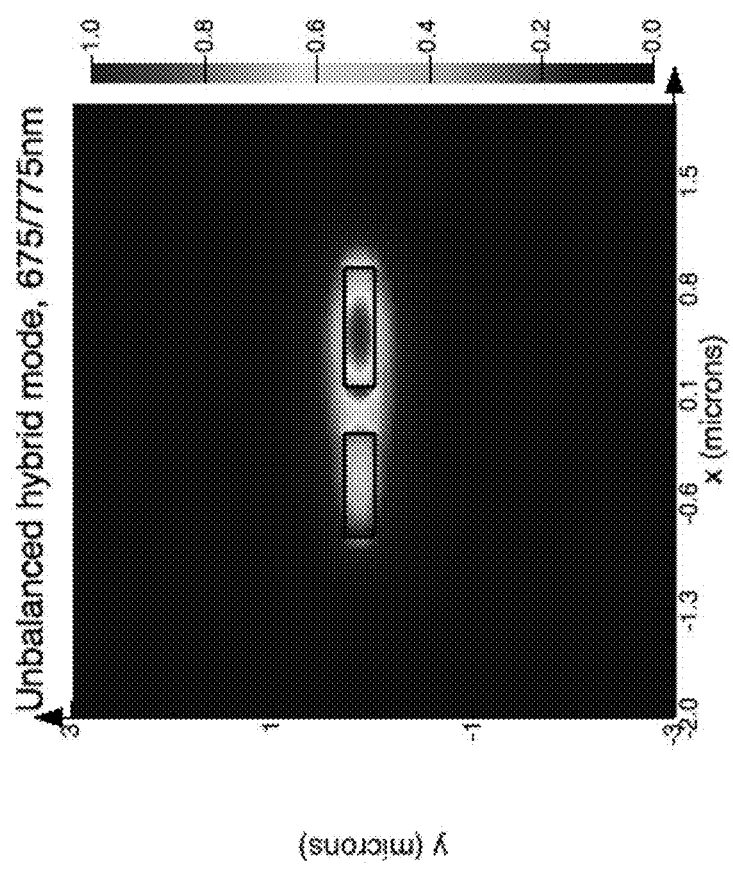
FIG. 5 is a cross-sectional view of the input waveguide of the Y-junction splitter of FIG. 4 at the junction split illustrating light intensity.

With reference to FIGS. 4 and 5, another embodiment of the Y-junction splitter 41 of the present invention comprises an input port 42 optically coupled to an input waveguide 43, which gradually expands from an input end proximate the input port 42 to a junction split section 44 at an output end. The input waveguide 43 expands linearly or exponentially with a gradually decreasing slope. The expansion is by at least a factor of 2 or between 1.5 and 2.5, e.g., from a 1.2 µm input end to a 2.7 µm output end. An input beam of light is launched via the input port 42 from an external source, and propagates into the input waveguide 43 to the junction split (JS) section 44 along a longitudinal axis 45 and in the direction of propagation, and expands adiabatically to the output end of the input waveguide 43. First and second output waveguides 46 and 47, respectively, extend from the output end of the input waveguide 43 for receiving first and second portions of the input beam according to a desired unbalanced splitting ratio, e.g., 25/75, and for outputting the first and second portions to output ports 49a and 49b, respectively.

As above, with reference to FIGS. 2 and 3, the structure of the mode-matching JS 41 provides that the width of the input waveguide 43 is wider than the combined widths of the first and second output waveguides 46 and 47 and the gap 48, resulting in a mode-matching discontinuity, e.g., stepped shoulders at the JS 44 on opposite sides thereof adjacent the first and second output waveguides 46 and 47, each shoulder including a surface perpendicular to the direction of light propagation 45. The shoulder may be wider than the gap, but not as wide as the output waveguides 46 and 47. The width at the output end of the input waveguide 43 is about twice as wide as the combined width of the first and second output waveguides 46 and 47.

In an alternative embodiment, the mode-matching JS 44 may include a subwavelength gratings in the gap 48 alternative to or in combination with the aforementioned discontinuity, as hereinbefore disclosed with reference to the JS 14.

Each of the first and second output waveguides 46 and 47 are divided into a plurality of sections 46a to 46d and 47a to 47d, respectively. Initial sections 46a and 47a form an unbalanced region, as section 46a comprises a straight sections parallel to the longitudinal axis 45 with a constant width, e.g., 100 nm to 300 nm for Si/SiO$_2$ or 500 nm to 800 nm for SiN/SiO$_2$, while section 47a comprises an initial expansion section, linearly expanding from the JS 44 to section 47b. Ideally, the inner walls of the initial unbalanced sections 46a and 47a are separated by a constant gap width, e.g., between 50 nm to 500 nm, but ideally less than 300 nm, while the outer wall of the initial section 47b tapers away from the longitudinal axis 45; however, other arrangements are within the scope of the invention. The length of the initial sections 46a and 47a are typically between one half to two times the length of the Y-junction core region 43 or in absolute terms preferably at least 5 µm, preferably less than 20 µm, and preferably between 5 µm and 10 µm.

In order to create the unbalanced Y-junction 41, an unbalanced region is used where light is confined in a hybrid mode or super mode. The unbalanced region is defined as a region where the width of one of the junction arms, i.e., 47a, is tapered, i.e., expands. This breaks the symmetry of the super mode adiabatically, which results in shifting the power distribution towards one arm or another (See FIG. 5). Arbitrary splitting ratios can be achieved by properly selecting the un-balanced region's length and by tapering the symmetrical super mode to an asymmetrical with sought power distribution.

Once the light is in the super mode, past the JS 44, a V-splitter is used to split the mode into the two mode splitting sections 46b and 47b. The V-splitter shape constantly separates the two mode splitting sections 46b and 47b at an acute angle, e.g., 3° to 15°, from the longitudinal axis 45, and linearly decouples the output waveguides 46 and 47, which is found to be simpler and more efficient than an otherwise S-bend. Furthermore, the S-bend may result in high order mode coupling, if the bend radius is not large enough; which is avoided using a V-splitter. The V-splitter sections 46b and 47b have constant, but different widths, e.g., 46b is 500 nm to 800 nm wide, while 47b is 700 µm to 1.6 µm wide.

Final expansion section 46c gradually, e.g., linearly, expands the first output waveguides 36 by a factor of approximately 1.3 to 2, e.g., from 500 nm to 800 nm to 700 µm to 1.6 µm, to equal the expansion provided by the initial expansion section 47a. Ideally, the inner walls of the final expansion sections 46c and 47c extend coplanar, and are separated by the same angle as the mode splitting sections 46b and 47b; however, any structure is within the scope of the invention. Final expansion sections 46c and 47c are used in the V-splitter, once the gap between the input and output waveguide arms 46 and 47 is sufficiently large, such that it avoids having mode overlap.

Bend sections 46d and 47d redirect the ends of the first and second output waveguides 46 and 47, respectively, to be back parallel with the longitudinal axis 45, and at the same width as the end of the final expansion sections 46c and 47c.

Lithographic rounding at the interfaces may be included to provide a smooth transition between sections.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A waveguide Y-splitter comprising:
    an input port for launching an input beam of light;
    an input waveguide including a longitudinal axis, capable of providing adiabatic expansion of the input beam of light from the input port to an output end, which has a width that supports a fundamental mode and a second order mode;
    first and second output waveguides extending from the output end of the input waveguide on either side of the longitudinal axis and separated by a gap, wherein each of the first and second output waveguides includes an initial section having an inner wall, defining the gap, substantially parallel to the longitudinal axis, and wherein the initial sections and the gap are capable of supporting a super mode of the incoming beam of light, which spans the first and second output waveguides and the gap; and
    a mode-matching junction between the input waveguide and the first and second output waveguides for splitting the input beam of light, capable of propagating the fundamental mode of the incoming light to a fundamental super mode;
    wherein the initial section of the first output waveguide comprises a constant width; and wherein the initial section of the second output waveguide comprises a width expanding in order to create an imbalance in the power distribution at the output waveguides.

2. The Y-splitter according to claim 1, wherein the width of the input waveguide expands adiabatically from a width supporting single mode propagation of the input beam of light to the output end.

3. The Y-splitter according to claim 1, wherein the initial sections extend at least 1 µm from the input waveguide at a constant width and a constant gap therebetween.

4. The Y-splitter according to claim 1, wherein the mode matching junction includes a discontinuity in the input waveguide to provide mode matching between the input waveguide and the first and second output waveguides.

5. The Y-splitter according to claim 4, wherein the output end of the input waveguide is wider than a combined width of the gap and the first and second output waveguides resulting in the discontinuity.

6. The Y-splitter according to claim 5, wherein the discontinuity comprises shoulder surfaces perpendicular to the longitudinal axis adjacent outer sides of the first and second output waveguides.

7. The Y-splitter according to claim 6, wherein the shoulder surfaces are wider than the gap, and not as wide as the first output waveguide.

8. The Y-splitter according to claim 6, wherein a width at the output end of the input waveguide is about twice as wide as a combined width of the first and second output waveguides.

9. The Y-splitter according to claim 4, wherein the mode-matching junction further comprises a subwavelength grating in the gap.

10. The Y-splitter according to claim 1, wherein the subwavelength grating start with a high fill ratio in the gap and adiabatically taper to a low fill ratio.

11. A waveguide Y-splitter comprising:
an input port for launching an input beam of light;
an input waveguide including a longitudinal axis, capable of providing adiabatic expansion of the input beam of light from the input port to an output end, which has a width that supports a fundamental mode and a second order mode;
first and second output waveguides extending from the output end of the input waveguide on either side of the longitudinal axis and separated by a gap, wherein each of the first and second output waveguides includes an initial section having an inner wall, defining the gap, substantially parallel to the longitudinal axis, and wherein the initial sections and the gap are capable of supporting a super mode of the incoming beam of light, which spans the first and second output waveguides and the gap; and
a mode-matching junction between the input waveguide and the first and second output waveguides for splitting the input beam of light, capable of propagating the fundamental mode of the incoming light to a fundamental super mode;
wherein the mode-matching junction further comprises a subwavelength grating in the gap.

12. The Y-splitter according to claim 11, wherein the subwavelength grating start with a high fill ratio in the gap and adiabatically taper to a low fill ratio.

13. The Y-splitter according to claim 1, wherein each of the first and second output waveguides also includes a mode splitting section extending from the initial section at an acute angle to the longitudinal axis.

14. The Y-splitter according to claim 13, wherein the acute angle is between 3° and 15°.

15. The Y-splitter according to claim 1, wherein each of the first and second output waveguides further comprises an expansion section extending from the mode splitting section, each expansion section expanding a width of each of the first and second output waveguides.

16. The Y-splitter according to claim 15, wherein an inner wall of each of the expansion sections is at the acute angle to the longitudinal axis.

17. The Y-splitter according to claim 11, wherein the initial section of the first output waveguide comprises a constant width; and wherein the initial section of the second output waveguide comprises a width expanding in order to create an imbalance in the power distribution at the output waveguides.

18. The Y-splitter according to claim 1, wherein the initial sections extend at least 5 μm from the input waveguide with a constant gap therebetween.

19. The Y-splitter according to claim 18, wherein the first output waveguide further comprises a final expansion section extending from the mode splitting section, the final expansion section expanding a width of the first output waveguide.

20. The Y-splitter according to claim 19, wherein an inner wall of the final expansion section is at the acute angle to the longitudinal axis.

* * * * *